May 16, 1967 P. DEMAN 3,320,544

ANGLE-MODULATION SIGNAL SYSTEM OF THE ANGLE-LOCK TYPE

Filed March 31, 1966 2 Sheets-Sheet 1

Inventor
Pierre Deman

By Michael J. Striker
Atty.

May 16, 1967 P. DEMAN 3,320,544

ANGLE-MODULATION SIGNAL SYSTEM OF THE ANGLE-LOCK TYPE

Filed March 31, 1966 2 Sheets-Sheet 2

Inventor
Pierre Deman
by Michael S. Striker
Attorney 3,320,544

ANGLE-MODULATION SIGNAL SYSTEM OF THE ANGLE-LOCK TYPE

Pierre Deman, Paris, France, assignor to Compagnie Francaise Thomson Houston-Hotchkiss Brandt, Paris, France, a corporation of France Filed Mar. 31, 1966, Ser. No. 539,144
Claims priority, application France, Apr. 1, 1965, 11,498
10 Claims. (Cl. 331—8)

This invention relates to signal systems using phase and frequency modulation. In the present specification and claims, and in accordance with well-recognized usage, the term "angle" is utilized as generic to both frequency and phase, in such expressions as "angle modulation," "angle error," and the like.

The invention is more especially concerned with that class of angle-modulated signal receivers known as phase-lock or frequency or phase feedback loop. In a phase-lock system, a variable-frequency local oscillator is provided, and its output is applied to one input of a phase discriminator receiving the angle-modulated input signals at its second input. The error output from the discriminator is applied to an angle-varying input of the local oscillator so as to "lock" the output oscillations delivered thereby, into precise agreement with the input signals both as to frequency and phase.

Such frequency or phase feedback loop or phase-lock or, more broadly, angle-lock systems as they are here called, have important advantages over earlier types of angle-modulation receivers in that they possess a lower signal/noise reception threshold and are therefore well suited for long distance communication links, including communications with satellites and spacecraft. However, they present problems of their own involving, inter alia, the stability of the servo-loop provided in them. Should an angle error component be phase-shifted more than 90° and transferred with substantial gain through the servo-amplifier, it will be fed back to the discriminator with what will, in effect, amount to positive feedback rather than negative. Undesired input signal frequency components (such as noise) will thereby be increased instead of being reduced, and in extreme cases oscillations may be set up in the servo-loop.

In an angle-lock receiver, there exists a possibility of the servo-loop becoming locked in on a spurious noise component of rather strong intensity, as may occasionally occur from atmospheric and other sources. The system "mistakes" the noise for useful intelligence and the angle-lock action operates to retain the unwanted noise thereby resulting in the loss of substantial amounts of intelligence.

It is, therefore, customary in angle-lock receivers to provide bandpass filter networks introducing high attenuation to input signal components outside the useful (intelligence) frequency band, and thereby reducing the likelihood of spurious lock-in or intelligence lock-out. Conventional filter networks of the type including inductance, capacitance and resistance in series introduce substantial phase shift, thereby tending to increase servo-loop instability as earlier explained. Corrective networks are frequently provided, using resistance and capacitance which will introduce phaseshifts not exceeding 90° and create attenuation that will compensate for the amplifier gain to prevent the amplifier phaseshift from approaching 180°, but their effectivness is limited.

The limitation of such conventional corrective networks as applied to angle-lock systems arises from the well-known fact that the gain/frequency and phase/frequency response curves of such networks are uniquely interrelated in accordance with the transfer function of the network. This interrelation requires that the attenuation rate, or slope of the gain/frequency response curve, of such a network, shall be limited to a maximum of 6 decibels per octave i.e., the attenuation can be no more than doubled when the frequency is doubled.

Due to this limitation of the gain/frequency response curve slope in conventional corrective networks or filters, a clear cut and positive cutoff of unwanted noise components outside the useful frequency band, cannot be achieved.

Conflict is therefore seen to exist as between the sensitivity (or low signal/noise ratio threshold) requirement, and the stability requirement, in conventional angle-lock angle-modulation systems.

It is an object of this invention to resolve that conflict, and thereby improve the sensitivity and lower the operating threshold of such systems without introducing servo-instability. Another object is to provide an improved bandpass filter and corrective network for an angle-lock angle-modulation receiver, whereof the transfer characteristic, and hence gain/frequency response curve, can be precisely shaped at will (by a suitable choice of circuit constants), in order to synthesize any desired response curve having a shape precisely matched with the frequency characteristics of the signals to be received. An object is to provide such a network whose gain/frequency response curve will, wherever this is desired, present a steep slope greatly exceeding the 6 db/octave limit of the prior corrective networks referred to, thereby accomplishing a sharp, clearcut cutoff action as regards frequencies outside a desired frequency band. An object is to provide such networks whose frequency response, cannot only be synthesized to match the frequency characteristics of the intelligence conveyed by the signals, but also allow for long-term input signal frequency variations, as due for example to oscillator drift and the like; and further, can be so shaped as to achieve certain desirable conditions peculiar to phase modulation, or peculiar to frequency modulation, as the case may be. An object is to provide such a network which will not introduce substantial loss into the system and which is especially designed for efficient use in conjunction with a balanced (or differential) variable-frequency oscillator.

Exemplary embodiments of the invention will now be described with reference to the accompanying drawings, wherein.

Figure 1:
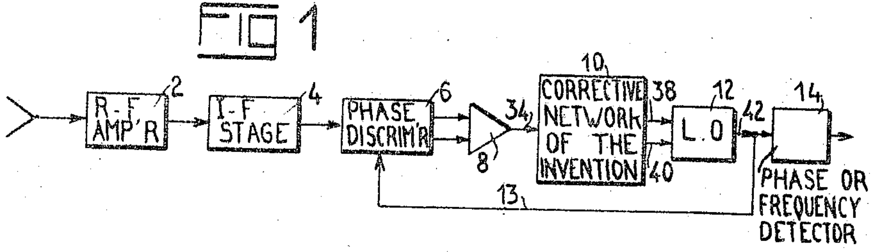
FIG. 1 is a block diagram of a typical phase-lock receiver system in which the improved network is shown incorporated.

The signal receiving system schematically shown in FIG. 1 comprises an R-F amplifier stage 2, fed with phase or frequency modulated signals from any suitable radio-frequency link, e.g. a radio link as indicated herein by the antenna shown. The amplified R-F signals are then passed to a conventional I-F modulator and amplifier stage 4, and the amplified intermediate-frequency signals are applied to one input of a phase discriminator 6, which has its other input connected through a feedback connection 13 with the output of a variable-frequency local oscillator 12. Discriminator 6 produces at its output a differential D.-C. voltage of one or the other sign corresponding in polarity and magnitude to the sense and magnitude of the phase displacement between the input signal and the local oscillator output. This discriminated voltage is applied to a conventional amplifier 8. The amplified voltage proportional to phase error is applied, by way of a corrective network 10 according to this invention, to the frequency-varying inputs of the local oscillator 12 already referred to. Due to the feedback loop 13, the oscillator 12 is made to deliver an output signal that is locked in frequency and phase with the frequency and phase of the input signal. The angle-locked oscillator output, in addition to being fed back over the loop 13, may be passed to a conventional phase or frequency detector or demodulator 14 for detection of the intelligence contained in the input signal.

The circuit just described is a typical phase-lock receiver system, and except for the construction of corrective network 10, is generally conventional. The function of the improved corrective network, to be later described, is to modify the overall transfer characteristic (or frequency-response) of the servo-loop including phase discriminator 6, amplifier 8, network 10, local oscillator 12 and feedback connection 13 in such a manner as to ensure a sharp attenuation of all but the undesired input signal components without introducing feedback instability.

Figure 2:
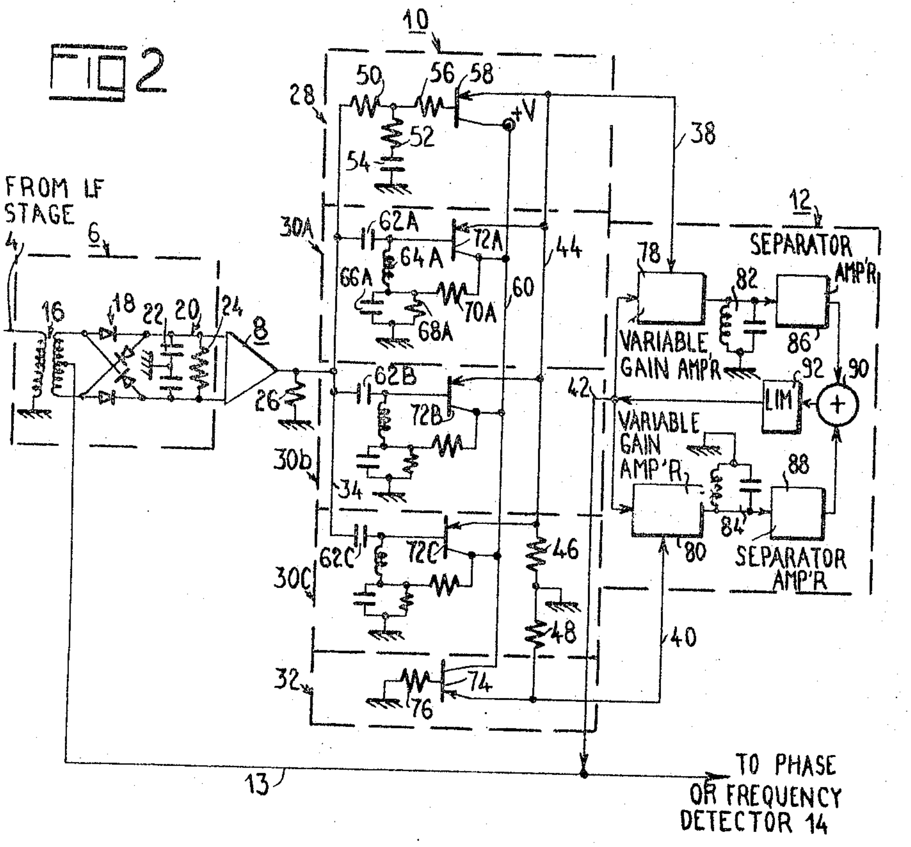
FIG. 2 is a circuit diagram of the servo-loop part of the system of FIG. 1 including the improved corrective network.

Turning to FIG. 2, the phase discriminator 6 is seen to be a conventional device known as a ring demodulator. The device comprises an input coupling transformer having the input signal from I-F stage 4 applied to one end of its primary winding the other end of which is grounded. The secondary winding of transformer 16 has its midpoint connected to the feedback conductor 13 from the output of oscillator 12, and has its ends connected to the input terminals of a bridge circuit generally designated 18 composed of four rectifier diodes connected in a "ring" assembly with relative polarities as shown. The operation of the device is well known and will only briefly be described. When the oscillator output voltage applied to the midpoint of the transformer (16) secondary winding is cophasal or anti-phasal with the input signal voltage applied across said secondary winding from the primary of the transformer, the two alternating voltages combine to provide at the output terminals of the diode ring 18, a net signal waveform composed of a series of semi-sinusoids of equal positive and negative excursions. When however the feedback signal applied over line 13 is not in phase with respect to the input signal applied across the ends of the transformer secondary winding, the waveform appearing across the output terminals of diode ring 18 is distorted so that the excursion on one of said terminals is increased and that on the other terminal is decreased. For example, when the feedback signal leads over the input signal, the voltage excursion on the upper terminal may be increased and that on the lower terminal decreased, the reverse being true in case the feedback voltage is lagging. A ripple voltage of one or the other polarity is then generated and this is smoothed out in the ripple filter 20 comprising the pair of capacitors 22 connected across the diode ring output terminals, with their common junction grounded, and the parallel resistor 24. There thus appears across the two inputs of the balanced aperiodic amplifier 8, a D.-C. voltage corresponding in sign and magnitude to the sense and angle of the phase shift present between the feedback signal and the input signal. This phase-error voltage is amplified in amplifier 8, which is shown as having a low output impedance in the form of grounded resistor 26. The amplified signal is applied to the corrector network 10.

The corrector network 10, which constitutes the heart of the invention, is made up of a number of parallel network sections 28, 30A, 30B and 30C, and a balancing circuit section 32. Section 28 is a D.-C. filter; sections 30A, 30B and 30C are A.-C. filters; and section 32 is a balancing circuit. As later described the local oscillator 12 used in this embodiment of the invention is a differential type oscillator having two frequency-varying input lines 38 and 40, the frequency excursion of the output signal appearing at the single output line 42 of oscillator 12 being differentially controlled to either side of a central value in accordance with the sense and magnitude of the D.-C. voltage difference present across the two oscillator input lines 38 and 40. Accordingly, the D.-C. filter section 28 and all of the A.-C. filter sections 30A, B and C have their output terminals connected in common to a network output line 44 connected to a first oscillator input line 38; and the balancing circuit section 32 has its output terminal connected to the other oscillator input line 40. The common network output line 44 is grounded through a load resistor 46 and the balancing section (32) output terminal is grounded through a load resistor 48.

The D.-C. filter section 28 is in the form of a conventional integral network including an input series resistor 50 having its input end connected to the common network input line 34, and having its output end shunted to ground by way of a resistor 52 and capacitor 54 in series. The output of this integral network at the junction of resistors 50 and 52 is connected through an output series resistor 56 to the base of a decoupling transistor 58. The transistor has its collector connected to a supply line 60 connected to a source of positive D.-C. voltage +V, and has its emitter connected to the common network output line 44.

The A.–C. filter sections 30A, 30B, 30C are all similarly constructed and their elements are correspondingly numbered and distinguished with the suffixes A, B, C respectively. It will be understood that whereas three parallel A.-C. filters are shown in the drawing, any number thereof may be provided in the corrective network of the invention depending on requirements, as will become clearer later. The A.-C. filters are single-pole tuned circuits, also known, as Lerner filters, and each comprises a capacitor 62 having one side connected to the common filter input line 27 and its other side shunted to ground by way of an inductor 64 followed by a parallel combination of capacitor 66 and resistor 68 in series with the inductor. The junction of indicator 64 and the parallel RC combination is connected through a resistor 70 to the positive voltage line 60. The output of the Lerner network at the junction of input capacitor 62A and inductor 64, is connected to the base of a decoupling transistor 72A having its collector connected to the positive supply line 60 and its emitter connected to common filter output line 44.

In each of the tuned A.-C. filter circuits, the capacitance 50 and inductance 64 constitute frequency-selective means which be so chosen that the associated tuned circuit has a sharp resonance peak. As will be disclosed in greater detail later, the frequency-selective means in the respective tuned circuits 30O, B, C are so selected that the resonant peaks of the circuits are different.

The resistors 68 and 70 constitute a voltage divider for biassing the base of each transistor between voltage line 60 and ground. Capacitors 66 serve to decouple high-frequency A.-C. components.

The balancing section 32 comprises a transistor 74 having its base grounded through a resistor 76, its collector connected to the positive voltage line 60 and its emitter connected to the output terminal of the balancing section connected to oscillator frequency-control input line 40 as earlier indicated.

The variable-frequency local oscillator 12 is of a balanced or differential type as earlier stated, and includes for instance two symmetrical channels each including a variable-gain tuned amplifier, respectively 78 and 80, having the oscillator input lines 38 and 48 connected to the respective gain-varying inputs thereof. The amplifiers 78 and 80 have their signal inputs connected to the oscillator output 42. The outputs of variable-gain amplifiers 78 and 80 are shunted to ground by respective parallel frequency-selective LC networks 82 and 84, and are applied to the inputs of separator amplifier stages 86 and 88 respectively. The outputs from the separator amplifiers are combined in an adding network 90, and the combined output is applied through a feedback-stabilizing voltage-limiting circuit 92 to the oscillator output 42. In the operation of such a balanced oscillator, it can be shown that when the voltages applied from lines 38 and 40 to the gain-varying inputs of the tuned amplifiers 78 and 80 are equal, so that the amplifiers have equal gain, the system will deliver at output 42 an oscillatory signal at a central frequency $f_0$ such that $f_0=\sqrt{f_1 f_2}$ where $f_1$ and $f_2$ are the different frequency values to which the amplifiers 78 and 80 are selectively tuned. In case of a difference in the voltage applied from lines 38 and 40, the gain through one of the amplifiers 78, 80 increases or decreases relative to the gain through the other, and the output frequency then departs from the central value $f_0$ in a sense that brings it closer to the tuned frequency, $f_1$ or $f_2$, of the particular amplifier channel wherein the gain is predominant. This balanced variable-frequency oscillator is interesting because of its excellent linearity.

It should be understood, however, that while both the phase discriminator 6 and variable-frequency oscillator 12 have been disclosed in some detail for completeness of the disclosure of the invention, the detailed showing of both devices 6 and 12 is exemplary only, and other suitable forms of phase discriminator and variable-frequency oscillator may be used in a system according to the invention.

The operation of the system described can be summarized as follows. In the steady state, when the oscillator output signal delivered on line 42 and fed back by line 13 to the secondary of input transformer 16 in phase discriminator 6 agrees in frequency and phase with the frequency and phase of an input signal applied to the primary of transformer 16, the diode ring 18 applies equal voltages through ripple filter 20 to amplifier 8, and the amplifier 8 applies a zero error voltage to the filter input line 27 of corrector network 10. In this zero phase-error condition, adjustments are so made that the potential applied to the upper oscillator input line 38 from voltage supply line 60 by way of the parallel filter decoupling transistors 58 and 72A–72C, and over common filter output line 44, retains a prescribed relationship with respect to the potential applied to the lower oscillator input line 40 from voltage supply line 60 by way of the single transistor 74 of the balancing section 32. Oscillator 12 then remains balanced and its output frequency retains its steady-state value. Should a discrepancy arise between the phase and/or frequency of the input signal and the feed-back oscillator output signal, amplifier 8 delivers a D.-C. output corresponding in sign and magnitude to the sense and amount of the phase error. The error output from amplifier 8 is transferred thorugh the parallel filter sections 28 and 30A, B and C of corrective network 10 and causes a corresponding variation in the voltage applied from common network output line 44 to the upper frequency-control input line 38 of oscillator 12. The gain through the upper amplifier 78 is thereby varied with respect to the gain through the lower amplifier 80, being increased or decreased relative thereto depending on the sense of the detected phase error. The oscillator output frequency is thereby varied in the manner earlier indicated until the phase and frequency equality between it and the input signal has been restored.

The action of the corrective network 10 of the invention will now be considered more closely. The over-all transfer characteristic (or frequency-response) of the network is the resultant of the elementary transfer characteristics of each of the component filter sections thereof, including D.-C. filter section 28 and A.-C. filter sections such as 30A, 30B, 30C. Thus, selection of the circuit constants, including the inductance, capacitance and resistance parameters in each of the filter sections such as 28, 30A, 30B, 30C provided in the corrective network, gives a means of precisely shaping or synthesizing the over-transfer characteristic of the network, and hence of the servo-system, so as to meet any specific demands as to the frequency characteristics of the signals being received.

Figure 3:
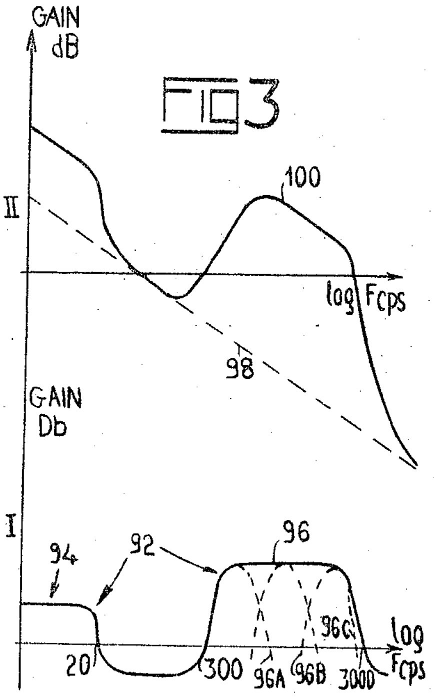
FIGS. 3, 4 and 5 illustrate typical shapes of gain/frequency response curves that can be synthesized by means of the corrective network of the invention; in each of these figures, the lower graph I represents the response of the network per se, while the upper graph II represents the over-all open-loop response of the servo-system embodying the network.

One important example of the response-synthesizing possibilities of the invention, as applied to a frequency modulation system, is illustrated in FIG. 3. The lower graph I represents the synthesized response curve, generally designated 92, of the corrective network 10. Curve 92 is seen to present a high-gain branch 94 at very low frequencies (say less than 20 c.p.s.), this branch representing the passband of the D.-C. filter section 28; and another high-gain branch, or hump, 96, at higher frequencies (say from 300 to 3400 c.p.s. as indicated in the case of a single telephone channel, or from 60,000 to 300,000 c.p.s. in the case of a sixty-channel multiplex system); the high-gain hump 96 represents the envelope of the combined resonance characteristics of the individual A.-C. filter sections such as 30A, 30B, 30C, indicated as the dotted resonance curves 96A, 96B, 96C. In the upper graph II, the downward-sloping line 98, indicating attenuation increasing with frequency, represents the response curve of phase-discriminator 6, amplifier 8 and variable oscillator 12. This drooping response is due to the fact that the frequency excursion of oscillator 12 is proportional to phase error as noted above. Curve 100 represents the combined open-loop response of the servo-loop including discriminator 6, amplifier 8 and oscillator 12 (the response component represented by line 98 as just noted), plus the response curve (96, graph II) of the corrective network 10.

The resulting transfer characteristic is seen to have sharp and clearcut passbands and high-attenuation depressed regions. The higher passband, corresponding to hump 96, represents the region of useful intelligence signals. The lower passband corresponding to rise 94 and representing the contribution of the D.-C. filter section 28 as noted above, serves to compensate for long-term frequency variations such as may be due to drift in the local oscillator 12 and an associated transmitter oscillator (not shown).

Further, the drooping over-all trend of the transfer characteristic 100, which trend is due to the contribution of the oscillator 12 (curve 98), has the following important advantage in the case of a frequency—(as distinct from phase)—modulation system. As earlier noted the proper operation of any phase-lock system requires that the effective phase shift between the input signal and the local oscillator output signal shall at all times be less than 90° and better less than 45°, failing which the phase lock action will lapse. To fulfill this condition, it is desirable in the case of large modulation indices that the band gain should be substantially proportional to the modulation index. In a frequency modulation system, the phase-modulation index or phase excursion generally is a decreasing function of modulating frequency (as indicated by the equation $\Delta f/F=\Delta\phi$, where $\Delta\phi$ is phase excursion, $\Delta f$ is frequency excursion, usually a constant, and F the modulating frequency). The over-all downward trend of the transfer characteristic 100 in FIG. 3 compensates for the increase in modulating index with decreasing frequencies, and thus ensures proper phase lock action at all frequencies and all modulation indices.

Figure 4:
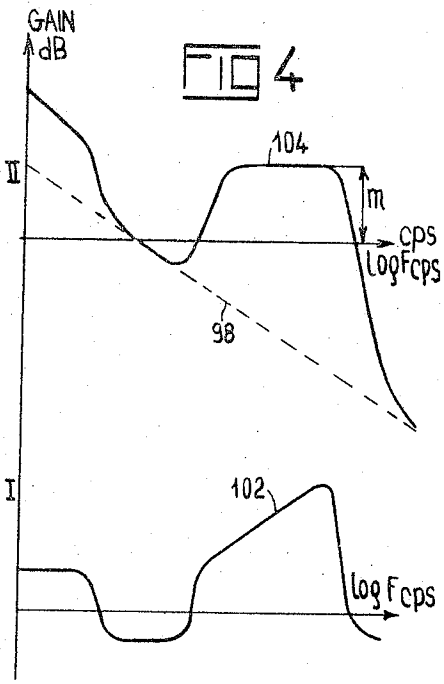

FIG. 4 illustrates another exemplary transfer characteristic, which is useful in a phase-modulation system. The response curve of the corrector network used in this case is shown in the lower graph I, and is seen to be generally similar to the response curve 92 (FIG. 3–I) used in a frequency-modulation system, except that the high-gain branch corresponding to the useful A.-C. signals, and representing the contribution of the A.-C. filter sections 30A, 30B, 30C as explained with reference to FIG. 3, is here shaped to have a rising slope as indicated at 102. This slope is selected with a value substantially reverse from the slope of the line 98 (FIG. 4, graph II) which, as in FIG. 3, represents the response contribution of the variable oscillator 12 and other components. As a consequence, the over-all open-loop response curve, shown in the upper graph II of FIG. 4, has an A.-C. hump 104, in the intelligence signal band, which is flat, representing constant gain. This is desirable in a phase-modulation signal because, in contrast with frequency-modualtion, the modulation index in phase-modulation is substantially constant regardless of frequency (the corresponding gain is indicated as $m$).

Figure 5:
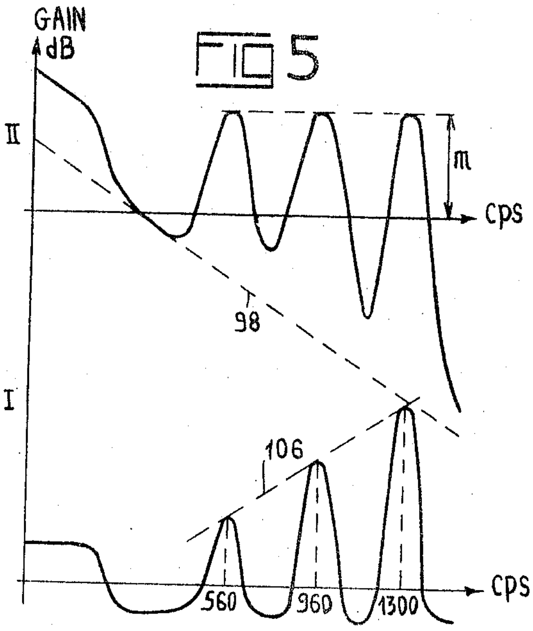

FIG. 5 illustrates yet another example of the manner in which the improved corrective networks of FIG. 2 can be used to shape the over-all transfer characteristics of a phase lock system. The example relates to a multichannel phase modulation system using three phase-modulated subcarriers, as frequently employed for telemetering links. The modulation index of each subcarrier is the same. The response curve of the corrective network, as shown in the lower graph I, is seen to include three sharp peaks, corresponding to the subcarrier frequencies used, e.g. 560 c.p.s., 960 c.p.s. and 1300 c.p.s. Each peak may correspond to the resonance peak of a related one of the three A.-C. filter sections 30A, 30B and 30C, the circuit constants being now selected so that the resonance peaks are spaced apart at the desired values, rather than overlapping as in the examples shown in FIGS. 3 and 4. Further, since phase-modulation is involved, the three peaks are seen to be of increasing altitude as shown, with the apices aligned on a line 106 of reserve slope from the line 98 representing the response of the variable oscillator. The resulting open-loop curve, shown in the upper graph II of FIG. 5, therefore presents three peaks of equal amplitude at the requisite subcarrier frequencies, the common amplitude $m$ corresponding with the desired constant value of the phase modulation index.

Both in FIG. 5 and in FIG. 4, the response curves shown include a low-frequency rising portion representing the contribution of the D.-C. filter section 28, as explained in connection with FIG. 3, and serving to allow for long-term frequency variations (drift).

In all of the transfer curves illustrated in FIGS. 3–5, clearcut, steep-sided passbands and cutoff regions can be obtained, making it possible to cut off radically any spurious signals and noise components and limit reception to the useful signals only. The output signal/noise ratio is thereby increased and the reception threshold lowered, without introducing instability to a degree believed unattained in any conventional phase-lock system of comparable type.

The feasibility of shaping the transfer characteristics of the improved corrective networks arises essentially from the type of filter network sections used therein. These, as disclosed herein are single-pole, tuned, circuits possessing a sharp resonance characteristic. Such circuits are disclosed for example in "Reference Data for Radio Engineers," 3rd edition, page 237, Fig. 1, Diagram A. Such circuits have a transfer function of the form $$\frac{1}{1+jQ\frac{F-F_0}{F_0}}$$

where Q is the circuit Q-factor, $F_0$ the tuning frequency of the circuit, and $j$ the imaginary unit vector. A circuit of this kind when fed by a sinusoidal input signal will introduce a phase shift that will in no case exceed ±90°. Further, because the circuits are dissipative in character, the gain/frequency and phase/frequency response curves thereof are not strictly interrelated as is the case with non-dissipating networks, and they can therefore be predetermined separately from each other. This in turn means that the overall gain/frequency response curves of the network can be made to have a very high slope, incomparably higher than the 6 decibels-per-octave which is the highest attenuation rate attainable with an RC network. It is the high slopes of the gain/frequency response curves, of the individual filters that makes possible the obtaining of the clearcut passband and cutoff regions evidenced by the over-all response curves in FIGS. 3, 4 and 5.

The corrective network of the invention may depart in construction from that shown in FIG. 2 without departing from the invention. The decoupling transistors here shown provide an advantageous means for decoupling the output of the individual tuned circuits at the common network output terminal, and are therefore used in preferred embodiments of the invention. They may, however, be omitted in some cases and replaced with passive resistance networks. When decoupling transistors are used as in the preferred embodiments, the balancing D.-C. network section 32 provides an advantageous means of eliminating the effects of any variations in the D.-C. potential caused by the decoupling transistors, and preserving balanced conditions at the input of the variable frequency differential oscillator.

What I claim is:

1. In an angle-modulation system including a variable-angle oscillator having an angle-varying input and an output, an angle-discriminator having one input connected to receive angle-modulated input signals and having another input connected to said oscillator output for receiving variable-angle oscillations therefrom whereby to deliver an angle-error output; and means connected to apply said error output to said angle-varying input of the oscillator whereby to constitute an angle-lock servo-loop to lock the frequency and phase of said oscillations into agreement with the frequency and phase of said input signals, the provision in combination therewith of:
- a corrective network connected in said servo-loop comprising;
  - a set of tuned cicuits connected in parallel between an input and an output of said network said tuned circuits having sharp resonant characteristics, each tuned circuit including:
    - frequency-selective means predetermining the resonant frequency thereof at an individual value different from the resonant frequency of other tuned circuits of said set, whereby to impart to said network an over-all frequency response which is the resultant of all the resonant characteristics of said tuned circuits which over-all frequency response will substantially correspond to the frequency characteristics of said input signals.

2. The system defined in claim 1, wherein the corrective network further comprises:
- an integral circuit connected in parallel with said tuned circuits between said network input and output to pass D.-C. and very low frequency components and allow for long-term variations in input signal frequency.

3. The system defined in claim 1, wherein said corrective network further comprises:
- active transducer devices connected between the output of each circuit and the network output and having high input impedance and low output impedance for decoupling the outputs of the individual circuits from one another.

4. The system defined in claim 1, wherein each tuned circuit comprises:
- a capacitor having one side connected to the network input and reactance connected to the other side of said capacitor, said capacitor and reactance forming part of said frequency-selective means; and
- a decoupling transistor having a base connected to said other side of said capacitor and said reactance, having an emitter connected to said network output, and having a collector connected to a biasing source.

5. In an angle-modulation signal system the combination comprising:
- a balanced variable-frequency oscillator including a pair of frequency-varying inputs and an output, including means for delivering a constant-frequency oscillation at a prescribed frequency at said output in the presence of balanced voltages applied across said inputs, and varying the frequency of said output oscillation in one or the opposite sense from said prescribed frequency value in the presence of an unbalance voltage across said inputs;

a phase-discriminator having one input connected to receive angle-modulated input signals and having another input connected to said oscillator output whereby to deliver a phase-error signal at an error output of said discriminator;

means connecting said discriminator output to said oscillator frequency-varying inputs of the balanced oscillator, said connecting means including:

a corrective network having an input connected to receive said discriminator error output signal and having an output connected to one of said balanced oscillator inputs; said corrective network comprising:

a set of tuned circuits connected in parallel between said network input and output said tuned circuits having sharp resonant characteristics and each tuned circuit including frequency selective means predetermining the resonant frequency thereof at an individual value different from the resonant frequency value of other tuned circuits of said set, whereby to impart to said network an over-all frequency response which is the resultant of all the resonant characteristics of said tuned circuits; and a balancing circuit connected to the other frequency-varying input of said balanced oscillator; including:

voltage means connected to said network and said balancing circuit whereby balanced voltages will be applied from said network and balancing circuit to both said frequency-varying inputs in the absence of said error signal applied to said network input, while the presence of an error signal will cause an unbalance in the voltage applied to said first frequency-varying input with respect to the voltage applied to said second frequency-varying input, in a sense and by an amount corresponding to the sign and magnitude of said error signal.

6. The system defined in claim 5, wherein said corrective network further comprises:

transistors connected between the output of each tuned circuit and the network output to present high input impedance and low output impedance; said transistors including one electrode connected to the output of the associated tuned circuit, another electrode connected to said voltage means and a third electrode connected to said network output, and including biasing resistance connected to said electrodes; and said balancing circuit comprises a transistor having one electrode connected to a reference potential, another electrode connected to said voltage means and a third electrode connected to said second frequency-varying input, and including biasing resistance connected to said electrodes of the balancing-circuit transistor; and load resistors connected to said network output and to said second frequency-varying input respectively.

7. The system defined in claim 1, wherein the frequency selective means of at least some of said tuned circuits are so selected that the resonance characteristics thereof substantially overlap whereby to impart to the network an over-all frequency response including a passband of substantial width corresponding to a useful frequency band of said input signals.

8. The system defined in claim 1, wherein the frequency selective means of at least some of said tuned circuits are so selected that the resonance characteristics thereof are substantially disjunct whereby to impart to the network an over-all frequency response including separate peaks corresponding to modulated subcarrier frequencies of said input signals.

9. The system defined in claim 1, wherein the frequency selective means of at least some of said tuned circuits are so selected that the resonance characteristics thereof have sharp resonance peaks of substantially equal altitude, whereby to impart to the network an over-all gain/frequency response curve that is generally flat, and impart to the servo-loop as a whole an over-all gain/frequency response curve that has a drooping trend.

10. The system defined in claim 1, wherein the frequency selective means of at least some of said tuned circuits are so selected that the resonance characteristics thereof have resonance peaks of altitude increasing with frequency, whereby to impart to the network an over-all gain/frequency response curve that has a rising trend, and impart to the servo-loop as a whole an over-all gain/frequency response curve that is generally flat.

No references cited.

ROY LAKE, *Primary Examiner.*

J. KOMINSKI, *Assistant Examiner.*